United States Patent

Jacob et al.

[11] Patent Number: 5,954,587
[45] Date of Patent: Sep. 21, 1999

[54] CONSTANT VELOCITY UNIVERSAL JOINT WITH LUBRICANT RESERVOIR

[75] Inventors: Achim Jacob, Kiel-Suchsdorf; Werner Jacob, Frankfurt, both of Germany

[73] Assignee: Lohr & Bromkamp GmbH, Offenbach/Main, Germany

[21] Appl. No.: 08/931,377

[22] Filed: Sep. 16, 1997

[30] Foreign Application Priority Data

Sep. 21, 1996 [DE] Germany .......................... 196 38 779

[51] Int. Cl.$^6$ ................. F16D 3/224; F16D 3/84
[52] U.S. Cl. .......................... 464/145; 464/171; 277/635
[58] Field of Search ..................... 464/141, 143, 464/145, 173, 175, 906; 277/550, 635, 636

[56] References Cited

U.S. PATENT DOCUMENTS

| | | | |
|---|---|---|---|
| 2,008,830 | 7/1935 | Johnson | 464/173 |
| 2,046,584 | 7/1936 | Rzeppa | 464/145 |
| 2,323,569 | 7/1943 | Rzeppa | 464/173 |
| 3,204,427 | 9/1965 | Dunn | 464/175 |
| 3,287,934 | 11/1966 | Asher | 464/145 |
| 3,362,192 | 1/1968 | Orain | 464/906 |
| 3,664,152 | 5/1972 | Macielinski | 464/145 |
| 3,807,195 | 4/1974 | Faulbecker | 464/173 |
| 3,822,570 | 7/1974 | Fisher | 464/173 |
| 3,858,412 | 1/1975 | Fisher et al. | 464/906 |
| 4,132,422 | 1/1979 | Sankey et al. | 464/173 |
| 5,222,914 | 6/1993 | Mazziotti | 464/145 |
| 5,346,431 | 9/1994 | Okuyama et al. | 464/171 |

FOREIGN PATENT DOCUMENTS

| | | |
|---|---|---|
| 1091714 | 5/1965 | European Pat. Off. . |
| 1429176 | 7/1972 | European Pat. Off. . |
| 149258 | 4/1937 | Germany ........................ 464/173 |
| 2205798 | 2/1972 | Germany . |
| 2205798 | 1/1973 | Germany . |
| 3705611 | 10/1990 | Germany . |
| 3744927 | 6/1992 | Germany . |

Primary Examiner—Eileen Dunn Lillis
Attorney, Agent, or Firm—Howard & Howard

[57] ABSTRACT

A constant velocity universal joint has an outer part (1) with outer tracks (3), and an inner part (6) with inner tracks (10) which, together, each receive one of a plurality of balls (13). The ball is guided by a cage (14). The cage is guided on a guiding face (9) of the inner part (6) by a spherical guiding face (16). The outer part (1) is closed towards one side by a first attaching part (5). The other side is closed by a sealing boot (20) which is secured to the outer part (1) on the one hand and to a second attaching element (12) on the other hand. The second attaching element (12) is connected to the inner part (6) so as to be rotationally fixed. The inner part (6) is held and centered relative to the outer part (1) by the balls (13) and the cage (14) on the one hand and by a control element (18) arranged between the outer part (1) and the inner part (6) on the other hand. To permit lubricant to be stored specifically in the region of the two guiding faces 9, 16 which are in contact with one another, there is provided a sealing cap (21) which at least partially covers the outer cage face and a sealing face (13) associated therewith. As this method achieves improved lubrication conditions, it is possible to use simpler lubricants as well, such as those used in rolling contact bearings.

10 Claims, 4 Drawing Sheets

CONSTANT VELOCITY UNIVERSAL JOINT WITH LUBRICANT RESERVOIR

BACKGROUND OF THE INVENTION

The invention relates to a constant velocity universal joint having a hollow outer part whose inner face comprises circumferentially distributed outer tracks, an inner part whose outer face comprises circumferentially distributed inner tracks and a spherical guiding face. Each outer track, together with the opposed inner track, receiving a ball for torque transmitting purposes, and having a cage which comprises a hollow spherical guiding face and an outer cage face. The cage is arranged between the inner face of the outer part and the outer face of the inner part and which guides the balls by means of windows. A first attaching part is connected to the outer part and close the joint towards one side. A second attaching part is provided in the form of a journal or shaft and which is connected to the inner part. A sealing boot is secured to the outer part on the one hand and to the second attaching part on the other hand and which closes the joint towards the other side, and enclosing a lubricant. The hollow cage, by means of its guiding face, is guided on the spherical guiding face of the inner part, with both of them, by means of their centers, being centered on the joint articulation center around which the outer part and the inner part carry out angular movements relative to one another.

Such constant velocity universal joints are typically covered by a sealing boot. The sealed joint is filled with lubricant which largely fills the free space between the joint components and between the sealing boot and the outer part and the second attaching element respectively.

As already described in DE-AS 22 05 798, boot failure results in a collapse of the lubrication system and thus, as a rule, in joint failure. With constant velocity universal joints which can only carry out angular movements, the boot has to bridge the entire space between the outer part and the second attaching element. During operation, there is a risk of the lubricant, in the course of time, largely collecting in the sealing boot. There is then no longer sufficient lubricant available at the parts which actually have to be lubricated and are in sliding contact with one another. Furthermore, the lubricant contained in the sealing boot constitutes a load on such parts because it rotates with them. This is the reason why it is proposed in DE-AS 22 05 798, additionally, to provide a further fixing point for the sealing boot at the cage. For this purpose, the cage is provided with a suitable projection. This measure reduces the mechanical load on the sealing boot, but does not solve the problem of providing sufficient lubricant in the regions actually to be lubricated.

It is therefore the object of the invention to provide a constant velocity universal joint wherein the parts which are in sliding contact with one another, especially the cage and inner part, are supplied with a sufficient amount of lubricant on their respective sliding faces.

SUMMARY OF THE INVENTION

In accordance with the invention the objective is achieved in that a sealing cap is secured at the second attaching part, and extends over part of the outer cage face, which part forms a sealing face. The sealing face is spherical and comprises a center which is centered on the joint articulation center. The sealing cap is sealed relative to the sealing face by means of its end extending over the sealing face. A lubricant reservoir is defined between the cap and the second attaching element on the one hand and the inner part and the cage on the other hand. At least part of the cage guiding face comes into contact with the lubricant contained in the lubricant reservoir when the outer part is articulated relative to the inner part.

The advantage of this embodiment is that in the case of joints wherein there exists a sliding contact between the cage and the inner part there is now available a lubricant reservoir directly in the region of said sliding faces, which lubricant reservoir serves to supply the sliding faces with lubricant. Nor is the lubricant moved out of the region by the centrifugal forces occurring in the region because the reservoir is enclosed, i.e. substantially, lubricant can escape out of the lubricant reservoir only in the direction of the sliding faces to be lubricated. As a result of this measure it is possible, under all major load conditions, to achieve a lubrication condition which corresponds to fluid friction. By storing the lubricant in the vicinity of the regions to be lubricated, there is achieved fluid friction, so that it is possible to use bearing lubricants which are friendly to rolling contact movements and which are able, quickly, to re-moisten overloaded sliding faces which, even in the case of impact-like loads, are subject to mixed or dry friction for short periods, thus re-achieving fluid friction conditions. There is no need for absolute sealing conditions to prevail between the cage and the sealing cap. It is sufficient to ensure that most of the lubricant is held back.

To provide a sufficiently large quantity of lubricant in the lubricant reservoir, it is proposed according to a further embodiment of the invention that an annular recess forming part of the lubricant reservoir is arranged between the second attaching part and the inner part. To ensure that the articulation movement between the outer part and inner part is as unrestricted as possible and, at the same time, to achieve a cost-effective solution, it is proposed furthermore that the cap is formed by a thin-walled plate metal part and is held in a groove in the second attaching part by means of a fixing portion. To facilitate the operation of fixing the sealing cap it is proposed that the cap fixing portion engaging the groove is slotted.

According to a further embodiment, the cap is provided in the form of a molded plastics part which comprises a collar in the form of a fixing portion by means of which the cap engages a groove in the second attaching element. The cap has a sealing lip which rests against the sealing face of the cage at the end of a bell adjoining the fixing portion.

In the case of constant velocity universal joints which are inserted into sideshafts and serve for directly driving the wheels of a motor vehicle, the speeds reach up to 2,800 revolutions per minute. In constant velocity joints to be used for example as high-speed joints in the longitudinal driveline of a motor vehicle, speeds reach up to 10,000 revolutions per minute. However, as a rule, such joints require only small articulation angles, but the sealing boots used for such joints are subjected to particularly high loads which are caused by centrifugal forces resulting from the high speeds and the lubricant rotating in the sealing boot.

For such applications with small articulation angles and high speeds the invention proposes that the outer part is associated with a sealing ring which is provided with at least one lip and which has a sealing effect relative to the outer cap face. With such an embodiment, the sealing boot remains substantially free from any lubricant. The lubricant is enclosed entirely in the region of the joint components, i.e. the outer part, inner part and cage as well as the sealing cap and the sealing ring.

Overall, the solution proposed by the invention is advantageous in that it is possible to use relatively cheap lubricants for lubricating the constant velocity joints, i.e. lubricants which are also used in rolling contact bearings. Normally, the lubricants used in CV joints also contain a percentage of solid lubricant which, however, is disadvantageous in view of the rolling contact movement of the torque transmitting balls.

Different embodiments are illustrated in the drawing and explained in greater detail with reference thereto.

DETAILED DESCRIPTION OF THE DRAWINGS

Figure 1:
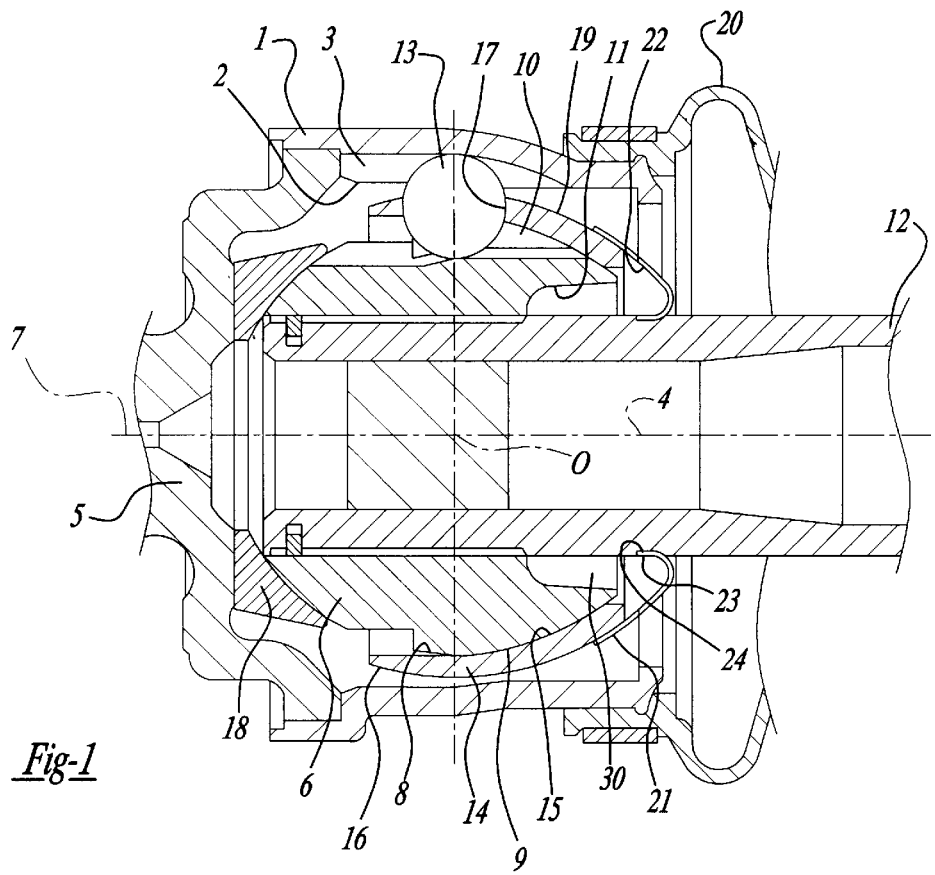
FIG. 1 is a longitudinal section through a first embodiment with a sealing cap for delimiting a lubricant reservoir, with the sealing cap constituting a formed plate metal part, with the joint being shown in the aligned condition.
Figure 2:
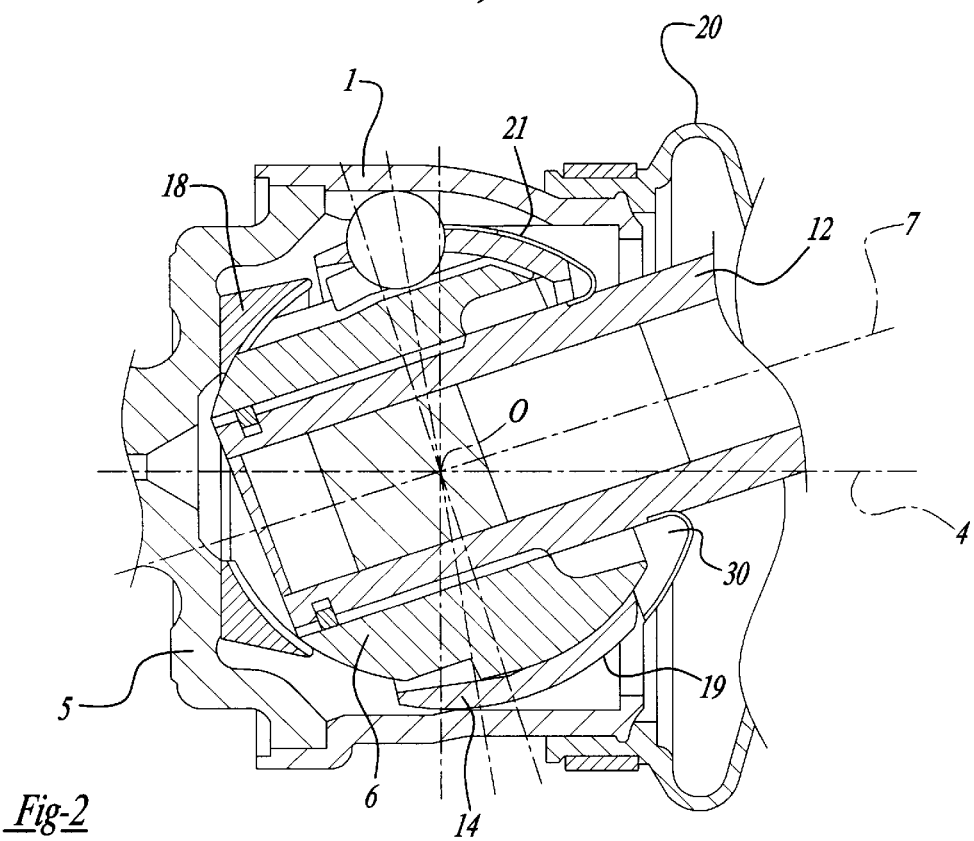
FIG. 2 is a constant velocity universal joint according to FIG. 1 in an articulated condition.

The constant velocity universal joint according to FIGS. 1 and 2 comprises an outer part 1 which constitutes a formed plate metal part and which, in its inner face 2, comprises outer tracks 3 which are circumferentially distributed around the longitudinal axis 4. The outer tracks extend in meridian planes around the longitudinal axis 4. The outer part 1 is closed by a first attaching element 5 which comprises a journal and a flange-like portion which is inserted into the outer part 1 and connected thereto by a low-heat welding method.

The inner part 6 is inserted into the cavity of the outer part 1 and defines a longitudinal axis 7. Inner tracks 10 are circumferentially distributed in the outer face 8 of the inner part 6 relative to the longitudinal axis 7 and extend in meridian planes. Each outer track 3 is arranged opposite one inner track 10 to form a pair. Furthermore, the inner part 6, on its outer face 8, comprises a guiding face 9 which forms part of a spherical surface. Furthermore, the inner part 6 comprises a bore into which there is inserted a second attaching part 12 in the form of a tubular shaft. Both are connected to one another by teeth in a rotationally fixed way, and in addition, a securing ring is provided for axially fixing the inner part 6 and the second attaching part 12 relative to one another. Between the outer face of the second attaching element 12 and the inner part 6 there is provided an annular recess 11 which is produced by enlarging the bore of the inner part 6. Furthermore, the inner part 6 comprises a spherical face which extends toward the first attaching element 5.

A ball 13 is received between each pair of outer track 3 and inner track 10 and serves to transmit torque between the outer part 1 and the inner part 6. The balls 13 are held by a cage 14.

For this purpose, the cage 14, by means of a spherical guiding face 15 provided in its cavity, is guided on the guiding face 9 of the inner part 6. Both above-mentioned faces 9, 15 are centered in the joint articulation center 0. Center O is arranged on the longitudinal axes 4, 7. The cage 14 comprises windows 17 for guiding the balls 13. The cage 14 comprises an outer face 16 of which at least one portion, i.e. the sealing face 19, is formed by a spherical face whose center is also located in the joint articulation center. However, the outer face 16 of the cage 14 is arranged at a distance from the inner face 2 of the outer part 1, i.e. it does not contact the latter. In the axial direction, the inner part 6, together with the cage 14, is centered relative to the outer part 1 by means of control element 18 in the joint articulation center of the joint. The control element 18 comprises a partial face in the shape of a hollow sphere against which the inner part 6 is supported by a corresponding spherical face, with the control element, in turn, being supported on a face of the attaching element 5, which face extends radially relative to the longitudinal axis 4. The control element 18 is able to carry out adjusting movements relative to said attaching element 5 in the radial direction. Furthermore, the assembly is sealed by a sealing boot 20 which, by means of its large diameter, is secured to the outer face of the outer part 1 and by means of its small diameter to the attaching element 12. To keep the friction in the constant velocity universal joint in respect of the parts which contact one another and slide on one another as low as possible, there is provided a lubricant which at least partially fills the free space between the joint components and which, in addition, fills at least part of the remaining space between the sealing boot 20 and the attaching element 12.

To store, and make lubricant available, especially in the region of the faces of the cage 14 and inner part 6 which slide on one another, a sealing cap 21 is provided which is bell-shaped. Cap 21 has a fixing portion 23 by means of which it is secured in a groove 24 in the second attaching element 12.

To facilitate assembly, the fixing portion 23 of the sealing cap 21 is slotted. The inner face 22 of the sealing cap 21 is spherical in shape to match the spherical sealing face 19 in the region of the outer face 16 of the cage 14 and at least partially extends over the sealing face 19. In the space between the cage 14, the annular recess 11 of the inner part 6, the outer face of the second attaching element 12 and the sealing cap 21, there is formed the lubricant reservoir 30 which stores lubricant for lubricating the sliding parts which are positioned in this region. As is particularly obvious from FIG. 2, the cage 14, under articulation conditions, penetrates more deeply into the free space, so that its guiding face 15 comes into contact with the lubricant contained in the lubricant reservoir 30, allowing the lubricant to reach the space between the two sliding parts, i.e. the guiding face 15 and the guiding face 9 of the inner part for the purpose of lubricating same. The two positions as shown in FIGS. 1 and 2 also demonstrate that the lubricant reservoir is maintained under articulation conditions.

In the present embodiment, no surface contact exists between the cage 14 and the outer part 1. Most of the friction takes place between the balls 13 and the outer tracks 3.

Figure 3:
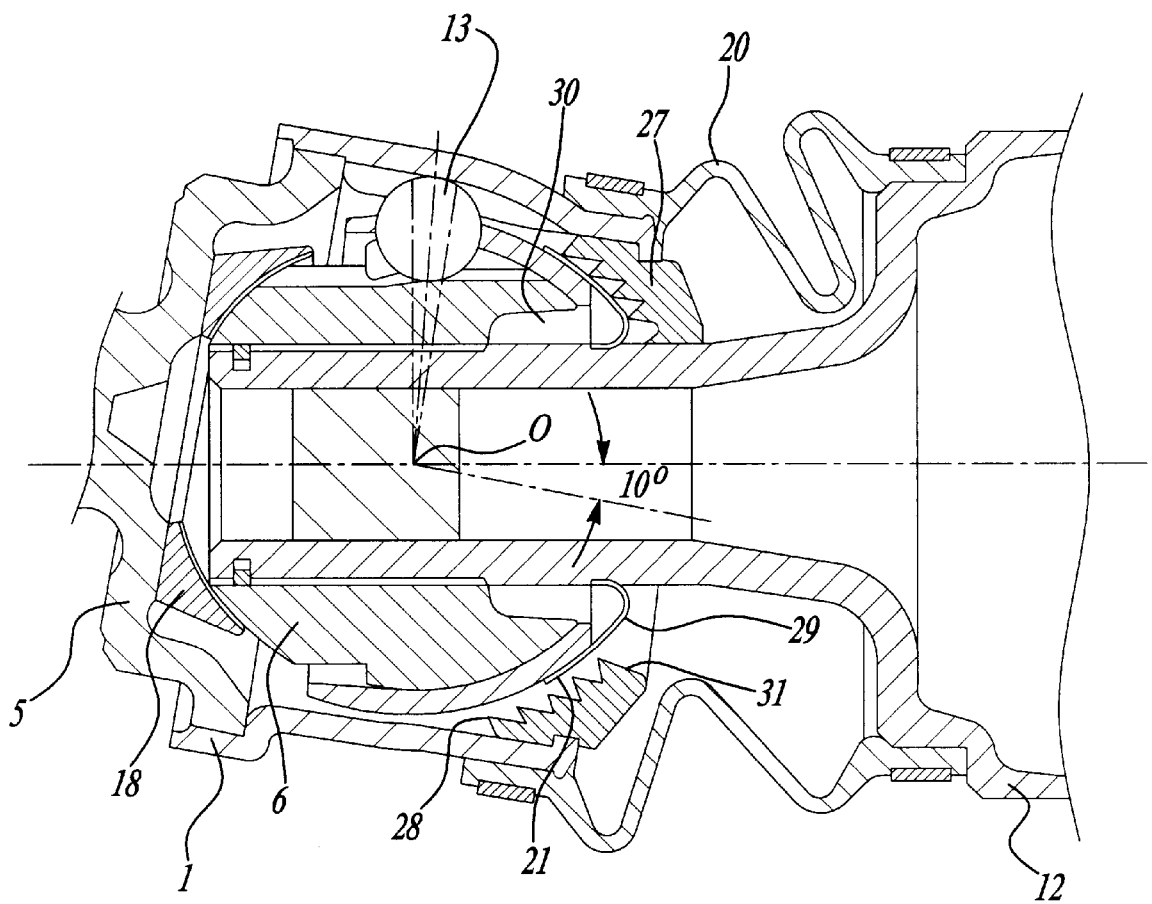
FIG. 3 shows a different embodiment including, in addition, a further sealing element in the form of a sealing ring, with the joint to be used as a high-speed constant velocity universal joint.

FIG. 3 shows a modified embodiment for storing lubricant in that it is provided for a joint preferably used as a joint which rotates at high speeds. Such joints can be used for example in the driveline between the front engine and gearbox of a motor vehicle and the rear axle differential. To keep the amount of lubricant small and away from the sealing boot 20, the embodiment according to FIG. 3 is additionally associated with a sealing ring 27 which, on its inside, comprises sealing lips 28 which are intended to contact the outer cap face 29 of the sealing cap 21. As a result, the entire cavity of the constant velocity joint is sealed. Lubricating grease can normally not reach the sealing boot 20. This also means that the sealing boot 20 is not loaded by the co-rotating lubricant. In addition, the bore 31 of the sealing ring 27 is designed to form a stop to prevent any movement of the second attaching element 12 relative to the outer part 1. The sealing cap 21 ensures that the lubricant is enclosed as explained in connection with FIGS. 1 and 2, whereas the sealing ring 27 additionally ensures that the lubricant in the remaining region, too, is prevented from escaping.

Figure 4:
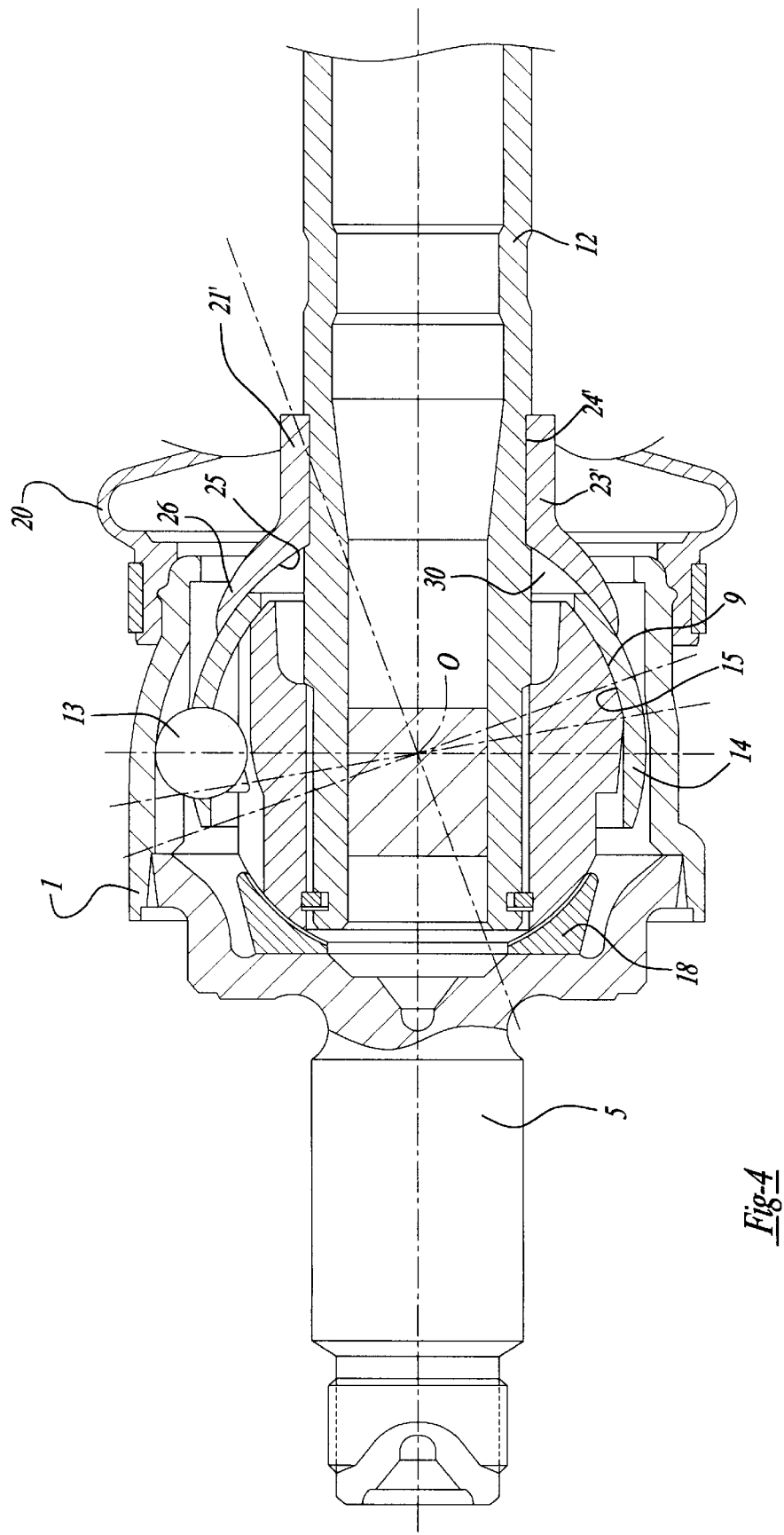
FIG. 4 a longitudinal section of a constant velocity universal joint in the aligned condition, with a molded plastic part being used as a sealing cap.

FIG. 4 shows a modified embodiment for the sealing cap 21' relative to the sealing cap according to FIGS. 1 to 3. The sealing cap 21' is a molded plastic part with a fixing portion 23' in the form of a collar which engages a relatively flat groove 24' in the second attaching element 12. The sealing cap 21' is bell-shaped, starting from the fixing portion 23'. At its free end, the bell 25 carries a sealing lip 26 by means of which it rests on the spherical guiding face 15 of the cage for sealing purposes. The sealing cap 21' also encloses a lubricant reservoir 30, so that the two cooperating guiding faces 9, 15 are sufficiently supplied with lubricant. In this case, too, the system is sealed outwardly by a sealing boot 20.

Figure 5:
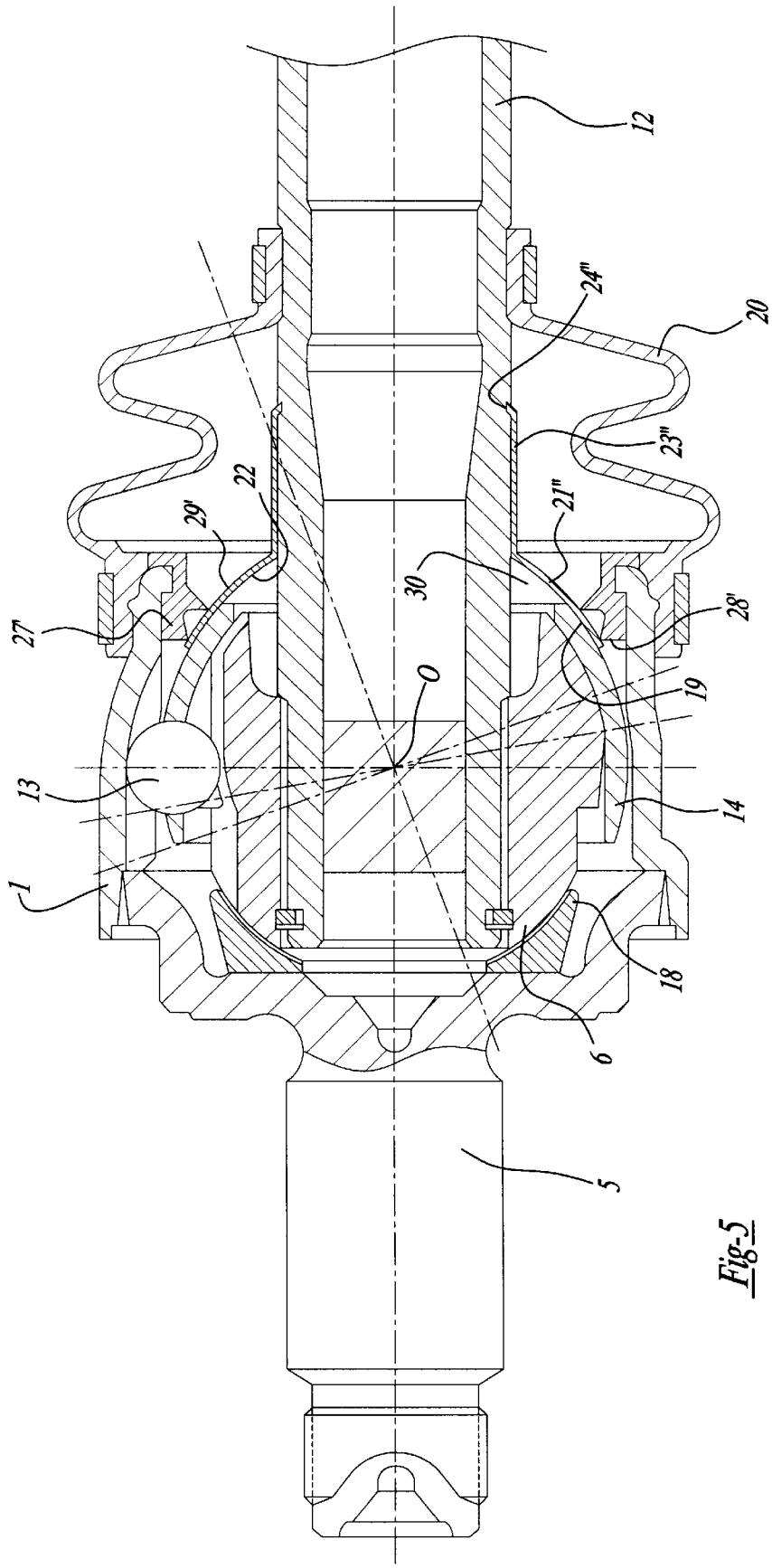
FIG. 5 shows a further embodiment which is provided with a sealing cap as a formed plate metal part and which, as compared to FIG. 3, is provided with a modified embodiment of the sealing ring for sealing the space between the outer part and the cage.

In the embodiment according to FIG. 5, there is provided a plate metal cap 21" for sealing a lubricant reservoir 30 in the region between the cage 14, the inner part 6 and the second attaching element 12, with the inner face of said cap 21" at least partially covering the sealing face 19 of the cage 14. Thus, even under articulation conditions a substantially closed lubricant reservoir 30 is achieved. Furthermore, the sealing cap 21" comprises a fixing portion 23' in the form of a sleeve which, at its end, comprises an inwardly bent portion by means of which the sleeve engages a groove 24" of the second attaching element 12. For sealing the region between the outer part 1 and the second connecting element 12 there is again provided a sealing boot 20. In addition, for sealing the interior of the constant velocity universal joint there is provided a sealing ring 27' which is secured to the outer part 1 and which, on it face directed toward the longitudinal axis, is provided with lips 28' which serve to contact the spherical outer face 29' while sealing same.

In the case of all embodiments according to FIGS. 3 to 5, the basic design of the constant velocity universal joint corresponds to that described in connection with FIGS. 1 and 2.

Although preferred embodiments have been disclosed, a worker in this art would recognize that modifications come within the scope of this invention. The following claims should thus be studied to determine the true scope and content of this invention.

We claim:
1. A constant velocity universal joint comprising:
   a hollow outer part (1) with an inner face (2) having circumferentially distributed outer tracks (3);
   an inner part (6) with an outer face (8) having circumferentially distributed inner tracks (10) and a spherical guiding face (9), with each said outer track (3), together with an opposed inner track (10), receiving one of a plurality of balls (13) for torque transmitting purposes;
   a cage (14) having a hollow spherical guiding face (15) and an outer cage face (16), which is arranged between said inner face (2) of said outer part (1) and said outer face (8) of said inner part (6) and which guides said balls (13) by means of windows (17);
   a first attaching part (5) connected to said outer part (1) and closing the joint towards a first side;
   a second attaching part (12) which is connected to said inner part (6);
   a sealing boot (20) secured to said outer part (1) on the one hand and to said second attaching part (12) on the other hand and which closes the joint towards a second side, and a lubricant, with said hollow cage (14), by means of said guiding face (15) being guided on said spherical guiding face (9) of said inner part (6), with both said guiding face (15) and said spherical guiding face (9) being centered on the joint articulation center (O) around which said outer part (1) and said inner part (6) carry out angular movements relative to one another; and
   a sealing cap (21, 21', 22") secured at said second attaching part (12) and extending over part of said outer cage face (16), which forms a sealing face (19), with said sealing face (19) being spherical and comprising a center which is centered on the articulation center (O), and that said sealing cap (21, 21', 22") is freely slidable over said sealing face (19) and when said outer part (1) is articulated relative to said inner part (6) said sealing cap (21, 21', 21") sliding over said sealing face (19) by means of its end extending over said sealing face (19) in a non-fixed manner and a lubricant reservoir (30) defined between said sealing cap (21, 21', 21") and second attaching element (12) on the one hand and said inner part (6) and said cage (14) on the other hand with said cage (14) by means of at least part of said guiding face (15) coming into contact with the lubricant contained in said lubricant reservoir (30) when said outer part (1) is articulate to said inner part (6).

2. A constant velocity universal joint according to claim 1, wherein an annular recess (11) formed in said inner part (6) forms part of said lubricant reservoir (30) and is positioned between said second attaching part (12) and said inner part (6).

3. A constant velocity universal joint according to claim 2, wherein said outer part (1) is associated with a sealing ring (27, 27') which is provided with at least one lip (28, 28') and which has a sealing effect relative to an outer cap face (29, 29').

4. A constant velocity universal joint according to claim 1, wherein said sealing cap (21) is formed by a thin-walled plate metal part and is held in a groove (24) in said second attaching part (12) by means of a fixing portion (23).

5. A constant velocity joint according to claim 4, wherein said fixing portion (23) of said sealing cap (21) is slotted.

6. A constant velocity universal joint according to claim 5, wherein said outer part (1) is associated with a sealing ring (27, 27') which is provided with at least one lip (28, 28') and which has a sealing effect relative to an outer cap face (29, 29').

7. A constant velocity universal joint according to claim 4, wherein said outer part (1) is associated with a sealing ring (27, 27') which is provided with at least one lip (28, 28') and which has a sealing effect relative to an outer cap face (29, 29').

8. A constant velocity universal joint according to claim 1, wherein said sealing cap (21') is provided in the form of a molded plastic part and comprises a collar in the form of a fixing portion (23) by means of which said sealing cap (21') engages a groove (24') in said second attaching element (12) and that by means of a sealing lip (26), said sealing cap (21') rests against said sealing face (19) of said cage (14) at the end of a bell (25) adjoining the fixing portion (23').

9. A constant velocity universal joint according to claim 8, wherein said outer part (1) is associated with a sealing ring (27, 27') which is provided with at least one lip (28, 28') and which has a sealing effect relative to an outer cap face (29, 29').

10. A constant velocity universal joint according to claim 1, wherein said outer part (1) is associated with a sealing ring (27, 27') which is provided with at least one lip (28, 28') and which has a sealing effect relative to an outer cap face (29, 29').

* * * * *